US012210522B2

United States Patent
Chen et al.

(10) Patent No.: US 12,210,522 B2
(45) Date of Patent: Jan. 28, 2025

(54) ENHANCED DATA INDEXING AND SEARCHING

(71) Applicant: MicroStrategy Incorporated, Vienna, VA (US)

(72) Inventors: Yanjie Chen, Hangzhou (CN); Ling Jing, Hangzhou (CN); Haijun Hu, Hangzhou (CN)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/950,872

(22) Filed: Nov. 17, 2020

(65) Prior Publication Data

US 2022/0156262 A1 May 19, 2022

(51) Int. Cl.
*G06F 16/2453* (2019.01)
*G06F 9/54* (2006.01)
(Continued)

(52) U.S. Cl.
CPC ........ *G06F 16/24532* (2019.01); *G06F 9/547* (2013.01); *G06F 16/24578* (2019.01);
(Continued)

(58) Field of Classification Search
CPC ......... G06F 16/24532; G06F 16/24578; G06F 16/951; G06F 16/9538; G06F 21/6227;
(Continued)

(56) References Cited

U.S. PATENT DOCUMENTS 5,920,854 A * 7/1999 Kirsch .................. G06F 16/313
707/999.005
6,092,074 A * 7/2000 Rodkin .................. G06F 16/748
707/706
(Continued)

FOREIGN PATENT DOCUMENTS

WO WO-2004095428 A2 * 11/2004 ....... G06F 17/30312

OTHER PUBLICATIONS

Lown, Cory, Tito Sierra, and Josh Boyer. "How users search the library from a single search box." College & Research Libraries 74.3 (2013): 227-241. (Year: 2013).*
(Continued)

*Primary Examiner* — Dennis Truong
(74) *Attorney, Agent, or Firm* — Fish & Richardson P.C.

(57) ABSTRACT

Methods, systems, and apparatus, including computer-readable media, for authentication enhanced data indexing and searching. In some implementations, a search service is configured to receive and process queries from a plurality of different application servers, where each application server has an associated data repository. The search service receives a query associated with a user of a client device. The search service provides the query to a search backend having a search index for the plurality of application servers, where the search index describes contents of each of the respective data repositories of the application servers. Search results are received from the search backend, including search results representing data elements from different data repositories of the different application servers. At least
(Continued)

some of the search results are provided as an output of the search service as a response to the query.

20 Claims, 4 Drawing Sheets

(51) Int. Cl.
*G06F 16/2457* (2019.01)
*G06F 16/25* (2019.01)
*G06F 16/33* (2019.01)
*G06F 16/901* (2019.01)
*G06F 16/951* (2019.01)
*G06F 16/9535* (2019.01)
*G06F 16/9538* (2019.01)
*G06F 21/62* (2013.01)

(52) U.S. Cl.
CPC ........ *G06F 16/951* (2019.01); *G06F 16/9538* (2019.01); *G06F 21/6227* (2013.01); *G06F 16/256* (2019.01); *G06F 16/3338* (2019.01)

(58) Field of Classification Search
CPC .... G06F 16/256; G06F 16/3338; G06F 9/547; G06F 16/901; G06F 2221/2141
See application file for complete search history.

(56) References Cited

U.S. PATENT DOCUMENTS

| | | | |
|---|---|---|---|
| 6,718,324 B2 | 4/2004 | Edlund et al. | |
| 7,219,154 B2 | 5/2007 | Blakley, III et al. | |
| 7,401,235 B2 | 7/2008 | Mowers et al. | |
| 7,421,421 B2 | 9/2008 | Newbold et al. | |
| 7,685,106 B2* | 3/2010 | Brooks | G06F 16/31 |
| | | | 707/999.003 |
| 7,860,871 B2 | 12/2010 | Ramer et al. | |
| 8,042,162 B2 | 10/2011 | Blakley, III et al. | |
| 8,291,468 B1 | 10/2012 | Chickering | |
| 8,429,147 B1* | 4/2013 | Dutton | G06F 16/951 |
| | | | 707/707 |
| RE45,327 E | 1/2015 | Bowers et al. | |
| 9,201,889 B1* | 12/2015 | Madany | G06F 16/148 |
| 9,852,220 B1* | 12/2017 | Guo | G06F 16/951 |
| 10,200,368 B2 | 2/2019 | Oberheide et al. | |
| 10,268,815 B2 | 4/2019 | Dunstan | |
| 11,120,257 B2 | 9/2021 | McNabney et al. | |
| 2003/0163739 A1 | 8/2003 | Armington et al. | |
| 2005/0050028 A1* | 3/2005 | Rose | G06Q 30/02 |
| 2005/0149496 A1* | 7/2005 | Mukherjee | G06F 16/24575 |
| 2006/0167928 A1 | 7/2006 | Chakraborty et al. | |
| 2006/0206532 A1* | 9/2006 | MacLaurin | G06F 16/1734 |
| 2006/0248039 A1* | 11/2006 | Brooks | G06F 16/31 |
| 2007/0073663 A1* | 3/2007 | Mcveigh | G06F 16/2455 |
| 2007/0143251 A1* | 6/2007 | Brooks | G06F 16/148 |
| 2007/0265831 A1* | 11/2007 | Dinur | G06F 40/232 |
| | | | 704/10 |
| 2008/0033954 A1* | 2/2008 | Brooks | G06F 16/9535 |
| | | | 707/999.009 |
| 2008/0301087 A1* | 12/2008 | Bernard | G06F 16/2272 |
| 2009/0012950 A1* | 1/2009 | Hasson | G06F 16/951 |
| | | | 707/999.005 |
| 2009/0083232 A1 | 3/2009 | Ives et al. | |
| 2009/0210429 A1* | 8/2009 | Agrawal | G06F 16/273 |
| 2009/0234809 A1* | 9/2009 | Bluger | G06F 16/13 |
| 2010/0161503 A1 | 6/2010 | Foster | |
| 2012/0143873 A1* | 6/2012 | Saadat | G06F 16/278 |
| | | | 707/741 |
| 2012/0185515 A1* | 7/2012 | Ferrel | G06F 16/25 |
| | | | 707/802 |
| 2012/0303632 A1* | 11/2012 | Kapoor | G06F 16/93 |
| | | | 707/742 |
| 2014/0108633 A1* | 4/2014 | Dai | G06F 16/24532 |
| | | | 709/223 |
| 2014/0289223 A1* | 9/2014 | Colwell | G06F 16/2455 |
| | | | 707/722 |
| 2014/0325524 A1* | 10/2014 | Zangaro | G06F 9/5083 |
| | | | 718/105 |
| 2014/0358887 A1* | 12/2014 | Morris | G06F 16/951 |
| | | | 707/723 |
| 2014/0358910 A1* | 12/2014 | Frigon | G06F 16/9038 |
| | | | 707/723 |
| 2014/0379661 A1* | 12/2014 | Marcus | G06F 16/256 |
| | | | 707/673 |
| 2015/0186381 A1 | 7/2015 | Yan et al. | |
| 2016/0096112 A1 | 4/2016 | Sharma et al. | |
| 2016/0188905 A1 | 6/2016 | Woss et al. | |
| 2017/0293653 A1* | 10/2017 | Harris | G06F 16/24542 |
| 2019/0080007 A1* | 3/2019 | Chevalier | G06F 16/9537 |
| 2019/0095241 A1* | 3/2019 | Ago | G06F 21/552 |
| 2020/0210647 A1* | 7/2020 | Panuganty | G06N 20/10 |
| 2021/0034714 A1* | 2/2021 | Jackson | G06F 21/10 |
| 2021/0117253 A1* | 4/2021 | Tang | G06F 9/4887 |
| 2021/0264049 A1* | 8/2021 | Barrett | G06F 16/24558 |

OTHER PUBLICATIONS

R. Baeza-Yates, C. Castillo, F. Junqueira, V. Plachouras and F. Silvestri, "Challenges on Distributed Web Retrieval," 2007 IEEE 23rd International Conference on Data Engineering, Istanbul, Turkey, 2007, pp. 6-20, doi: 10.1109/ICDE.2007.367846. (Year: 2007).*

Auth0.com [online], "Interaction-Based Authentication for Alexa Skills with Auth0," Apr. 27, 2017, retrieved on Apr. 21, 2021, retrieved from URL< https://auth0.com/blog/interaction-based-auth-for-alexa-with-auth0/>, 35 pages.

Developers.onelogin.com [online], Authenticating Alexa Skills With OneLogin, Dec. 2020, retrieved on Apr. 21, 2021, retrieved from URL https://developers.onelogin.com/authentication/tools/alexa>, 10 pages.

Tools.ietf.org [online], "Third-Party Token-based Authentication and Authorization for Session Initiation Protocol (SIP)," Nov. 19, 2019, retrieved on Apr. 21, 2021, retrieved from URL https://tools.ietf.org/id/draft-ietf-sipcore-sip-token-authnz-06.html.

Tools.ietf.org [online], The OAuth 2.0 Authorization Framework' Oct. 2012, retrieved on Apr. 21, 2021, retrieved from URL < https://tools.ietf.org/html/rfc6749>, 77 pages.

Tools.ietf.org [online], "OAuth 2.0 Token Introspection" Oct. 2015, retrieved on Apr. 12, 2021, retrieved from URL < https://tools.ietf.org/html/rfc7662>, 18 pages.

Tools.ietf.org [online], "JSON Web Token (JWT)", May 2015, retrieved on Apr. 21, 2021, retrieved from URL < https:ietf.org/html/rfc7519>, 31 pages.

US Office Action in U.S. Appl. No. 15/955,492 dated Apr. 24, 2020, 17 pages.

US Office Action in U.S. Appl. No. 15/955,492 dated Oct. 5, 2020, 19 pages.

US Office Action in U.S. Appl. No. 15/955,492 dated Apr. 28, 2021, 10 pages.

* cited by examiner

ENHANCED DATA INDEXING AND SEARCHING

TECHNICAL FIELD

This specification relates generally to data indexing and searching.

BACKGROUND

Data indexing typically involves collecting, parsing, and storing data to facilitate fast and accurate information retrieval. Similarly, data searching typically involves receiving a query, processing the query, and using the resulting data to retrieve information from storage using a standard search index that corresponds to a single application server. In using a multitude of search indexes, issues sometimes arise where an index can become stale. This can lead to errors when attempting to perform searches using the index, as well as other related inefficiencies. Some of these issues have been addressed to extent by frequently rebuilding the multiple search indexes, however this introduces its own set of inefficiencies in the form of increased processing demand and strain.

SUMMARY

A disclosed system may be used to perform data indexing and data searching. In performing data indexing, the system may generate or update an existing search index that can later be used during data searching. The system may generate or update the search index based on metadata extracted from or generated for data that is to be stored. For example, the search index may indicate the structure of various stored data objects, or structures that exist in the stored data objects such as particular graph elements, field elements, or other data elements. In searching for stored data based on a received query, the system may refer to the search index to identify groupings of data objects, or particular portions of data objects that are relevant to the query.

In some implementations, the system uses a centralized search index across multiple application servers. For example, the system may refer to a single search index for all or a group of application servers. Accordingly, any updates to the search index will be made available to all application servers. This comprehensive search index may allow the system to perform a search against all available environments, all projects, all objects types, all attribute elements in data elements, and the specific attributes themselves. As an example, the system may use the comprehensive search index to index platform analytics data, subscription data, and collaboration data across multiple application servers.

In some implementations, the system appends additional information to a received query. For example, a search service of the system may be used to append context data to update the query that can be used by a search backend of the system to retrieve more accurate search results. The query may be modified such that one or more user IDs, project IDs, or application server IDs are appended to the original query before being sent to the search backend of the system.

In some implementations, the system ranks the search results. For example, the system may assign weighted values to each of the search results. The weighted value may be calculated based on results of a comparison between a query and the search index. The weighted value may additionally be based on results of a comparison between the query and content of data objects. The weighted values may be generated using a machine learning model that receives the query and the search index as input In one general aspect, a method includes: providing, by the one or more computers, a search service configured to receive and process queries from a plurality of different application servers, where each application server includes one or more processing nodes and has an associated data repository for the application server; receiving, by the one or more computers and through the search service, a query associated with a user of a client device; providing, by the one or more computers and by the search service, the query to a search backend having a search index for the plurality of application servers, where the search index describes contents of each of the respective data repositories of the application servers; receiving, by the one or more computers, search results that the search backend generated in response to the query using the search index, the search results including search results representing data elements from different data repositories of the different application servers; and providing, by the one or more computers, at least some of the search results as an output of the search service provided in response to the query.

Implementations may include one or more of the following features. For example, in some implementations, receiving the query includes receiving a query forwarded by a particular application server of the application servers in response to the particular application server receiving the query sent by the client device; and providing the search results comprise providing the at least some of the search results to the particular application server.

In some implementations, the search service is implemented using multiple processing nodes to provide multiple search service instances that operate in parallel to concurrently process search requests issued by client devices to the different application servers.

In some implementations, the method includes maintaining, by the one or more computers, a search request queue to store search requests issued by the different application servers based on queries received by the application servers from client devices; where receiving the query includes obtaining, by one of the search service instances, the query from the search request queue.

In some implementations, the method includes dynamically scaling a number of processing nodes or a number of search service instances that are active based on a volume of query requests received by the application servers.

In some implementations, the method includes: detecting that search demand satisfies a threshold; and in response, increasing a number of instances of the search service that are active or increasing an amount of processing resources allocated for the search service.

In some implementations, the method includes: receiving context information corresponding to the query; and generating an augmented query based on the query and the context information; where providing the query to the search backend includes providing the augmented query to the search backend.

In some implementations, the context information includes at least one of: a user identifier for the user; data indicating a job role of the user; data indicating an organization or department of the user; a device identifier for the client device; a server identifier for a particular application server that received the query from the client device; an application identifier for an application from which the query was initiated; data indicating a device type for the client device; a location of the client device; a time the query was issued; a user interface from which the query was initiated; telemetry data from the client device indicating a state or status of the client device; or data indicating a task, workflow, or project associated with the user.

In some implementations, generating the augmented query includes altering a scope of the query based on the context data, where the alteration to the query: adds a limitation to the query based on the context information, where the added limitation restricts a scope of search results obtained; adds attributes to adjust a ranking of search results based on the augmented query; restricts a scope of the query based on access permissions for the user; limits a set of data sources or data collections to be searched; indicates a level of access for the user based on a current level of authentication of the user; populating or adding fields with values that the search service retrieves from the search index or a semantic graph that indicates relationships among objects defined in a centralized metadata repository; adds information based on one or more prior data accesses by the user; or adds keywords determined from the search index or the semantic graph.

In some implementations, the method includes: in response to receiving the query, accessing the search index; and using data from the search index to augment the query; where providing the query to the search backend includes providing the augmented query to the search backend.

In some implementations, the method includes: before providing the query to the search backend, performing pre-processing of the query by the search service using data access policies, user authentication data, user identity data for the user, or data access permissions of the user, the pre-processing generating a reformulated query for an application programming interface (API) of the search backend; where providing the query to the search backend includes providing the reformulated query to the search backend through the API.

In some implementations, each of the data repositories includes at least some unique content not present in the data repositories of other application servers; and where the search index is a search index for a combined set of data that includes the content of the data repositories for each of the plurality of application servers.

In some implementations, the method includes: determining, by the search service and for each of the search results, whether the user is authorized to access the data represented by the search result; and filtering the results to remove one or more results that corresponds to data that the user is not authorized to access; where providing at least some of the search results includes providing the filtered results.

In some implementations, the method includes maintaining, by the one or more computers, an index event queue to store indexing requests issued by the different application servers in response to changes in data in their respective repositories; operating multiple data retrieval module instances configured to operate in parallel, where each of the data retrieval module instances are configured to: obtain index events from the index event queue; communicate with the application server that issued the index event to obtain the data item corresponding to the index even from the data repository of the application server that issued the index event; and provide the retrieved data to the search engine backend for processing, the search backend being configured to update the index to include information describing the data item.

In some implementations, generating a data package includes index data from the search index; and providing the data package to a client device to enable the client device to perform local, client-side search of at least some of the contents of the data repositories of the application servers using the index data.

In some implementations, the method includes: accessing usage data indicating measures of use of different data objects in the repositories of the different application servers; incorporating the measures of use of the different data objects into the search index; and using the measures of use of the different data objects to boost search relevance scores for more heavily used objects, the search relevance scores being used to select and/or rank the search results for the query.

In some implementations, the measures of use comprise one or more of a measure of execution time or loading time for the data item, a measure of a number of users that have used the data item, a total accesses made to the data item, or a rate of errors occurring for uses of the data item.

In some implementations, the method includes indexing contents of the data repositories of the different application servers such that the search index provides a single, unified search index across all of the respective data repositories for the different application servers, where indexing the contents of the data repositories includes including, in the search index, data associated with respective data items that includes at least one of: measures of usage of the data items; access control data that indicates access policies or access restrictions for the data items; identifiers indicating one or more of organizations, departments, users, or projects associated with the data items; subscription data indicating organizations, departments, users, or user roles that are subscribed to receive the data items; and collaboration data indicating sharing of data items or shared use of data items among users.

The described techniques can be used to realize numerous advantages. For example, the described techniques can be used to improve searching and indexing performance and efficiency. Notably, a centralized crawling service, search service, search backend, and search index can be used by multiple application servers to process index event messages and search event messages. Using a centralized search backend with a centralized search index reduces the number of index updates needed and the number of indexes that need to be searched. Moreover, the application servers have limited if any involvement in the management of event messages after they are offloaded to these centralized components. As such, resources and processing power can be freed up for the application servers to perform other tasks, and/or to perform current tasks more efficiently or with increased performance.

Another benefit of the described techniques is the ability to produce better search results. Notably, a centralized search service can receive and/or acquire context information corresponding to a particular query. The centralized search service can use this information to augment the query. In augmenting the query, the search service can effectively limit a search to particular content sources, to particular types of data objects, to particular data objects, to data objects or content sources associated with a particular user or a group of users, or the like. As such, a search performed using the query can be limited so as to be more efficient and/or to produce better, more relevant search results.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
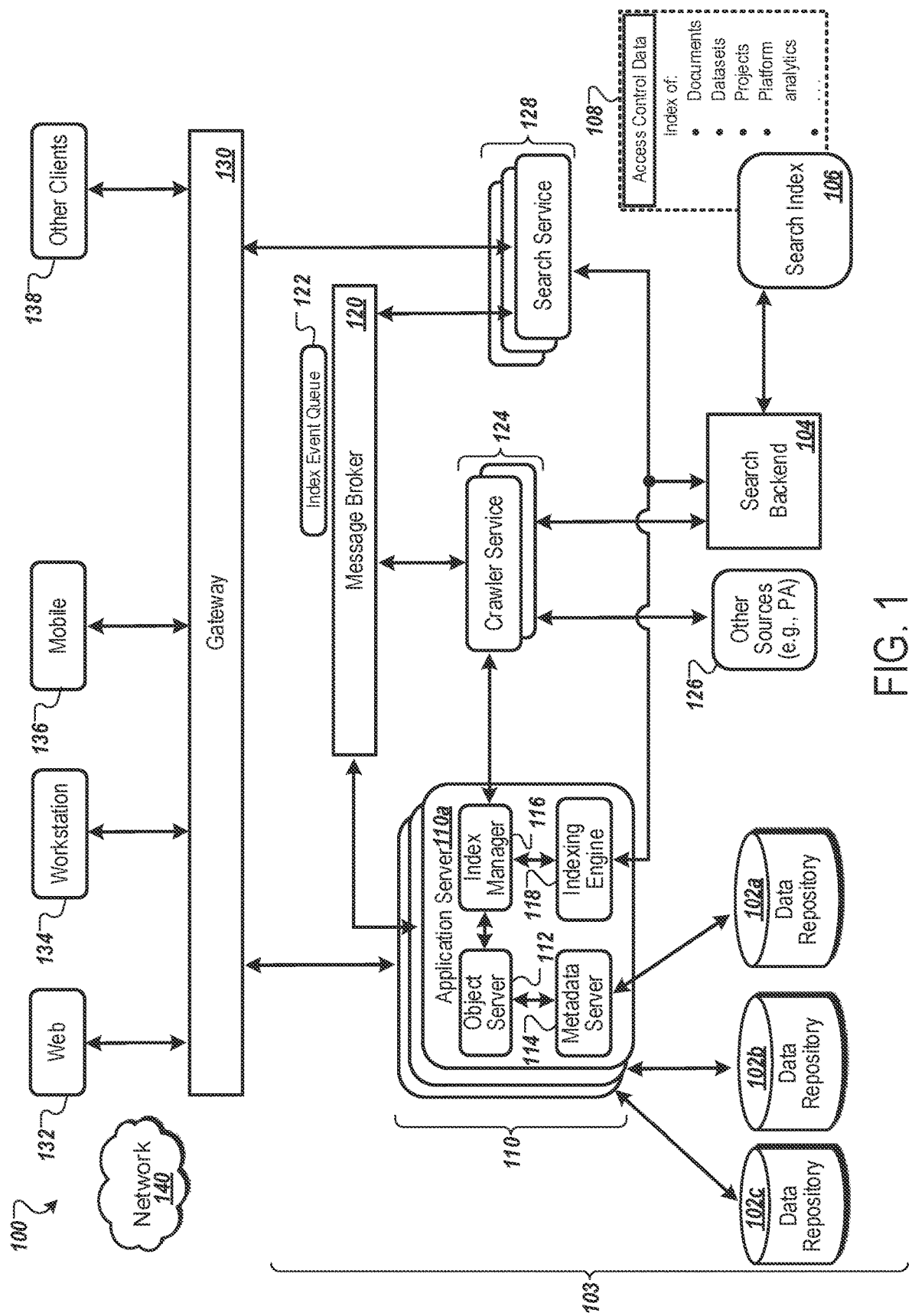
FIG. 1 is a diagram that illustrates an example of a system for enhanced data indexing and searching.

FIG. 1 is a diagram that illustrates an example of a system for enhanced data indexing and searching. A disclosed system may be used to perform data indexing and data searching. In performing data indexing, the system may generate or update an existing search index that can later be used during data searching. The system may generate or update the search index based on metadata extracted from or generated for data that is to be stored. For example, the search index may indicate the structure of various stored data objects, or structures that exist in the stored data objects such as particular graph elements, field elements, or other data elements. In searching for stored data based on a received query, the system may refer to the search index to identify groupings of data objects, or particular portions of data objects that are relevant to the query.

The system 100 of FIG. 1 includes various clients 132, 134, 136, 138, a server architecture 103, and a gateway 130 that provides information between the clients and the server architecture 103. The server architecture 103 includes multiple applications servers 110 and corresponding data repositories 102a-102c. The server architecture 103 also includes a message broker 120, a crawler service 124, a search service 128, a search backend 104, and a search index 106. The components of the server architecture 103 are centralized with respect to the multiple application servers 110. The various components of the system 100 may communicate over a network 140.

The clients can include the web client 132, the workstation client 134, the mobile client 136, and/or one or more other clients 138. The web client 132 may be, for example a web browser. The workstation client 134 may be, for example, a computing device such as a desktop computer or a laptop computer. Similarly, the mobile client 136 may be a mobile computing device such as a smart phone or a tablet. A user may use one of the clients 132, 134, 136, and 138 to add, remove, or update files of an application server, and, in response, trigger the system 100 to perform an index update. If however, the user submits a query through one of the clients 132, 134, 136, and 138, the system 100 may, in response, perform a search and generate corresponding search results.

The clients 132, 134, 136, and 138 can interact with the gateway 130 over the network 140. The network 140 may include private and/or public networks. The network 140 may be or include the internet. The network 140 may be or include a cellular network.

The gateway 130 is a network gateway that is used to connect the clients 132, 134, 136, and 138 to the server architecture 103. The gateway 130 may include various protocols for communicating with the different clients 132, 134, 136, and 138. The The application servers 110 includes multiple servers designed to run applications. The application servers 110 includes a first application server 110a. The application server 110a includes an object server 112, a metadata server 114, an index manager 116, and an indexing engine 118. The indexing engine 118 may be an Elasticsearch indexing engine. The other application servers of the application servers 110 may also each include similar components to those described specifically with respect to the application server 110a.

The Indexing engine 118 may perform search and indexing functions from a centralized location. That is, the Indexing engine 118 may be a centralized component of the server architecture 103 that is (i) not limited to the application server 110a, and/or (ii) capable of serving all of the application servers 110.

The indexing engine 118 may be designed to communicate with the search backend 104. As an example, the indexing engine 118 may receive data from the search backend 104 indicating when the search index 106 has been updated. The indexing engine 118 may notify the index manager 118 when the search index 106 has been updated. For example, in response to receiving an indication that the search index 106 has been updated, the indexing engine 118 may generate a confirmation that indexing is complete and provide this confirmation to the index manager 118.

The indexing engine 118 may perform indexing functions from a centralized location. That is, the indexing engine 118 may be a centralized component of the server architecture 103 that is (i) not limited to the application server 110a, and/or (ii) capable of serving all of the application servers 110. From this centralized location, the indexing engine 118 may, for example, notify the index manager of each of the application servers 110 when the search index 106 has been updated.

The application servers 110 can generate event messages, such as indexing event messages (e.g., indicating new or modified data that needs to be indexed) and search event messages (e.g., queries). The application servers 110 can proceed to send event messages to the message broker 120 and/or directly to their corresponding service. For example, the application servers 110 may send index event messages to the message broker 120, and search event messages directly to the search service 128. As will be discussed in more detail below with respect to FIG. 3, in generating a search event message (e.g., a query), the application server 110a may retrieve corresponding context data from the data repository 102a. This context data may be attached and/or sent along with the corresponding search event messages to the search service 128 (e.g., the message broker 120). One benefit of passing the event messages to the message broker 120 to be subsequently processed by the crawler service 124 or the search service 128 (and/or directly the crawler service 124 and/or the search service 128) is that the servers of the application servers 110 are relieved from managing and interacting with the search backend 104. Accordingly, the performance of the application servers 110 can be improved, and/or the application servers 110 are free to process other items. This allows event messages to be processed asynchronously.

The data repositories 102a-102c corresponding to the application servers 110 can include databases, cloud data warehouses, servers, etc. The data repositories 102a-102c can include a wide range of different types of data. For example, the data repositories 102a-102c can store platform analytics data, user libraries, projects, data sets, etc.

The message broker 120 is an architectural pattern for event message validation, transformation, and routing. As described above, the message broker 120 may receive event messages from the application servers 110. The message broker 120 may proceed to add received index event messages to an index event queue 122. However, search event messages (e.g., queries) may be sent directly to the search service 128. That is, search event messages may bypass the message broker 120 to be immediately processed by a node (e.g., instance) of the search service 128.

In some cases, the message broker 120 receives and adds search event messages to a search event queue. The message broker 120 may store context data with corresponding search event messages in the search event queue. Alternatively, the message broker 120 may attach data to the search event messages when adding them to the search event queue. The search service 128 may use this data to retrieve the context data corresponding to a search event message retrieved from the search event queue.

The crawler service 124 can retrieve index event messages from the index event queue 122, and proceed to process them. The crawler service 124 may include multiple nodes where each node is able to retrieve and process an index event message from the index event queue 122. Each node of the crawler service 124 may be capable of processing one index event message at a time. After a node of the crawler service 124 has finished processing an index event message, it may pull the next index event message in the index event queue 122 to process. The number of nodes of the crawler service 124 running may depend on the current indexing demand (e.g., based on the number of event messages in the index event queue 122) or estimated indexing demand (e.g., based on the current number of users or clients, the time and/or date, the estimated number of users or clients for the time and/or date, etc.). The crawler service 124 may spin up additional nodes or spin down running nodes depending on the current indexing demand or the estimated indexing demand. For example, if the number of event messages in the index event queue 122 increases to exceed a predetermined number messages per current node of the crawler service 124, the crawler service 124 may spin up one or more additional nodes to handle the processing of the index event messages.

The crawler service 124 can identify various content sources to extract information that the search backend 104 can use to build and/or update the search index 106. The content sources may include the data repositories 102a-102c and the other sources 126, such as web pages, databases, cloud data warehouses, etc. The crawler service 124 may be used to retrieve particular data objects from a content source, parse through the data objects to extract information, and use the extracted information to categorize the data objects. The crawler service 124 may provide the data objects, the extracted information, and/or the categorizations and identifications of the corresponding data objects to the search backend 104. As an example, the crawler service 124 may parse through a particular data object retrieved from the data repository 102a through the application server 110a to determine that the data object is a document and contains a number of graph elements.

In processing an index event message, a node of the crawler service 124 may contact the corresponding application servers to retrieve the data (e.g., data objects) to be indexed from the appropriate repository where the data is stored.

The other sources 126 may include other content sources that the crawler service 124 can pull content from and, optionally, parse. The other sources 126 may include web pages, databases, cloud data warehouses, etc. The content of the other sources 126 can include platform analytics (PA) data. For example, the other sources 126 may store network usage, status, and/or performance data (e.g., of the network 140).

The search service 128 can receive or retrieve search event messages (e.g., queries) from the application servers 110 and/or the gateway 130. For example, the search service 128 may receive a request to process a query from the application server 110a or directly from the gateway 130. In response to receiving a search event message, the search service 128 may immediately process the search event message. In processing search event messages, the search service 128 can communicate with the search backend 104 to provide search queries and receive corresponding search results. Similar to the crawler service 124 described above, the search service 128 may include multiple nodes where each node is able to process one or more search event messages. For example, each node (e.g., instance) of the search service 128 may be able to process a single search event message at a time.

After a node of the search service 128 has finished processing a search event message, it may indicate that it is ready to receive a new search event message and/or may retrieve a new search event message. The number of nodes of the search service 128 running may depend on the current searching demand (e.g., based on the number of event messages it has received and/or is currently processing) or estimated searching demand (e.g., based on the current number of users or clients, the time and/or date, the estimated number of users or clients for the time and/or date, etc.). The search service 128 may spin up additional nodes or spin down running nodes depending on the current searching demand or the estimated searching demand. As an example, the search service 128 may spin up an additional node if it receives a query to process and all other running nodes are currently busy processing other queries. Similarly, the search service 128 may spin down one or more nodes if more than a threshold number of nodes are not currently be used to process queries. For example, if more than one of the nodes are not processing any queries, the search service 128 may spin down all but one of the nodes that are currently not processing any queries.

In some cases, where a search event queue is used, the number of nodes of the search service 128 running may depend on the on the number of event messages in the search event queue. For example, if the number of event messages in the search event queue increases to exceed a predetermined number messages per current node of the search service 128, the search service 128 may spin up one or more additional nodes to handle the processing of the search event messages.

The search service 128 may restrict the searching to particular information. For example, the search service 128 may restrict a searching using a retrieved query to particular projects (e.g., groupings of data objects, groupings of data objects associated with a particular user, groupings of data objects associated with a particular group of users, etc.), to particular types of data objects (e.g., documents, datasets, projects, platform analytics, etc.), to information associated with particular users or groups of users, to information available in particular sources (e.g., limit searching to a particular database), etc. The search service 128 may use context data associated with a retrieved query to determine how to restrict the information that is to be searched. This context data may be retrieved from one of the data repositories associated with the search event message. The search service 128 can use the context data to augment the retrieved search event message before providing it to the search backend 104.

In some cases, the search service 128 directly previews the search index 106 (e.g., without going through the search backend 104). For example, the search service 128 may be able to preview the search index to view the data types available in the search index. The search service 128 may use the previewed information to augment (or further augment) the retrieved search event message. For example, the search service 128 may use the previewed information to limit the search to one or more of the data types that are available, thereby making the search more efficient.

After providing a query or a modified query to the search backend 104, the search service 128 may receive corresponding search results from the search backend 104. The search results may be in the form of data object identifications, scores (e.g., scores associated with particular data objects that indicate a similarity between the data objects and the corresponding query), and/or the actual data objects. After obtaining search results, the search service 128 may provide the search results to the gateway 130.

In some cases, search event messages are added to a search event queue. The search service 128 may retrieve search event messages from the search event queue to process using the techniques described above.

The search backend 104 is a module designed to perform searching and indexing functions. For example, based on index instructions received from the crawler service 124, the search backend 104 can build or update the search index 106. Similarly, based on search instructions received from the search service 128, the search backend 104 can use the search index 106 to obtain search results. The search backend 104 may be provided by Elasticsearch. Other options include Google Cloud Search, Amazon CloudSearch, Microsoft Azure Search, IBM Watson Discovery, or Apache Solr. Alternatively, the search backend 104 may be provided by a database server, Oracle database management, MySQL, or the like.

Search index 106 is a centralized index for all of the application servers 110. The search index 106 may include information that categorizes different data objects of the data repositories 102a-102c. As an example, the search index 106 may include access control data 108 that includes an index of corresponding documents, datasets, projects, platform analytics, etc. One benefit of using a centralized search index such as the search index 106, is that it is the only index that must be regularly updated. This can help prevents situations where applications servers may otherwise rely on an out-of-date search index. This can also improve efficiency as there may otherwise be significant overlap between different search indexes. Accordingly, using a single search index may help to significantly reduce the number of index updates that are ultimately required. Moreover, using a single index can also help to improve search efficiency since only the one search index would need to be used in order to generate comprehensive search results.

In general, for indexing, the application server 110a detects when data in the repository 102a has changed, such as when a file is updated or a new file is created. The application server 110a sends an index event message to the message broker 120 indicating the data that needs to be indexed. The message broker 120 stores the index event message in the index event queue 122. The crawler service 124 extract events from the queue 122 and process them by contacting the corresponding application servers and retrieving the data to be indexed from the appropriate repository where the data is stored. The crawler service 124 may parse through the retrieved data to extract information for updating the search index 106. The crawler service 124 provide this information to the search backend 104, which proceeds to update the search index 106. Once the search index 106 has been updated, the search backend 104 may send a notification to the Indexing engine 118 of the application server 110a indicating that the search index 106 has been updated. The Indexing engine 118 may, in response, generate a confirmation for the application server 110a that indicates that the search index 106 has been successfully updated.

In general, for processing search queries, a client provides a query, which is passed to the gateway 130 and then to one of the application servers 110. As an example, the query may be passed to the application server 110a. The application server 110a sends the query (e.g., a search event message) to the search service 128 (or, in some cases, to the message broker 120) indicating that a search needs to be performed. The search service 128 starts to process the query. In processing the query, the search service 128 may retrieve context data from the appropriate repository. The search service 128 may use this context data to augment the retrieved query, and provide the augmented query to the search backend 104. The augmented query may restrict the search to particular data sources, types of data objects, data objects associated with particular users or groups of users, etc. The search backend 104 performs the search using the augmented query and the search index 106, and obtains search results. The search backend 104 provides the search results to the search service 128. The search service 128 may provide the results to the gateway 130, which passes them to the appropriate client.

Figure 2:
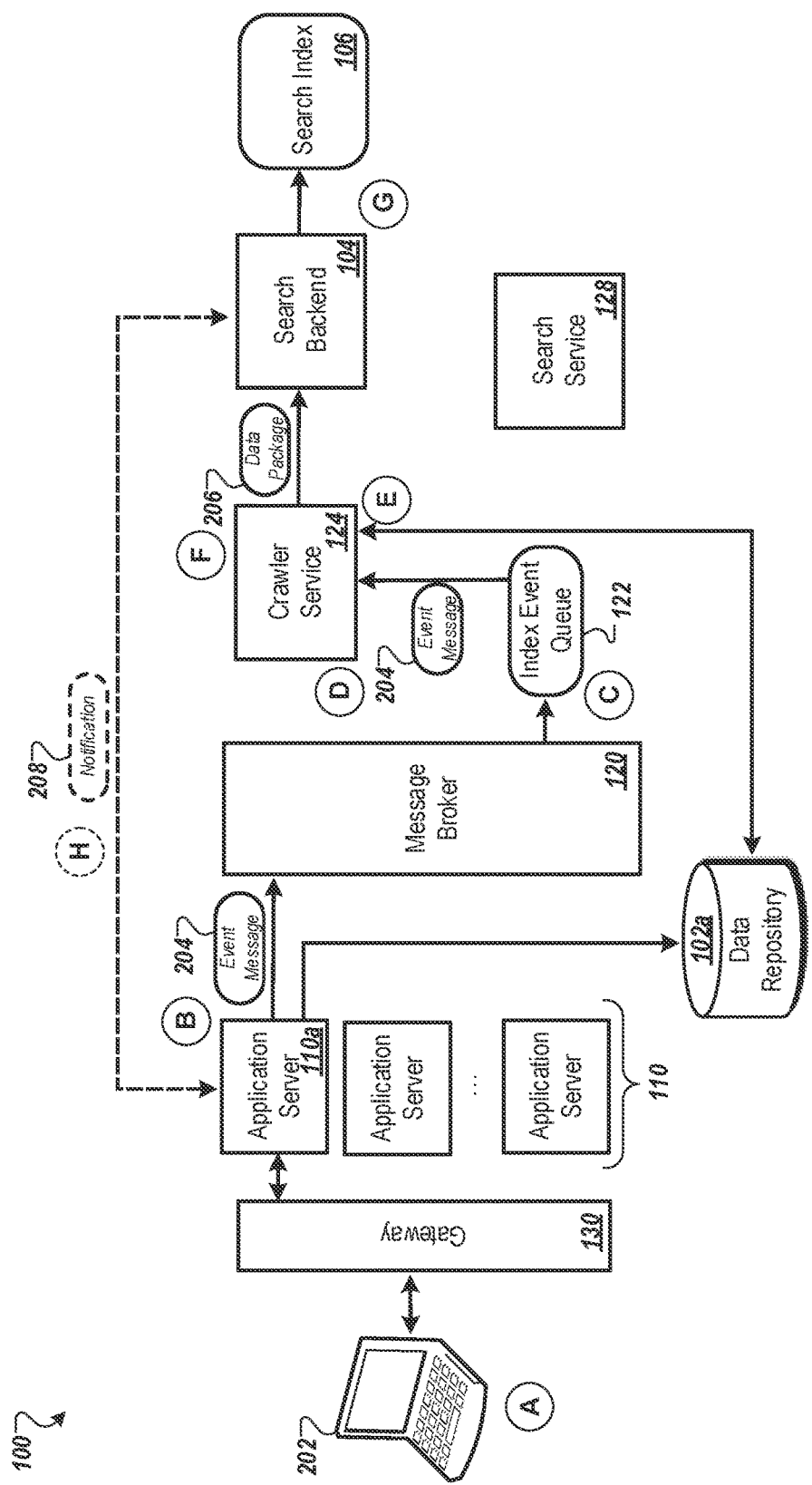
FIG. 2 is a diagram that illustrates an example of actions by the system to issue and process an index event.

FIG. 2 is an example of actions by the system 100 to issue and process an index event message. Only a subset of the components of the system 100 are shown for clarity in illustration.

In the example of FIG. 2, in step (A), a client device 202 makes changes to data of the data repository 102a, and, thereby, triggers the issuance of an event message 204. Specifically, the client 202 may modify an existing data object of the data repository 102a (e.g., stored in the data repository 102a), add a data object to the data repository 102a, and/or delete a data object of the data repository 102a. Each of these actions may serve as a trigger for the issuance of the event message 204.

The client 202 may be a workstation client or a mobile client. For example, the client 202 may be the workstation client 134 or the mobile client 136. The client 202 may be a computing device. For example, the client 202 may be a desktop computer, a laptop computer, a smart phone, or a tablet.

The data repository 102a may include various different types of data objects. For example, the data repository 102a may include platform analytics, user libraries, projects, data sets, etc. Accordingly, the detected change to the data in the data repository 102a may include a change to one or more of platform analytics data, user library data, project data, data sets, etc.

In some cases, the triggers for the issuance of an index event message are customized. For example, an administrator may customize the triggers for the issuance of an index event message to changes to particular types of data objects, to data objects associated with a particular project, to changes made by a particular user or a group of users, etc.

In step (B), the application server 110a, corresponding to the data repository 102a, issues the event message 204. The application server 110a may issue the event message 204 in response to detecting the change to the data repository 102a made by the client 202. The event message 204 may be an index event message as described above with respect to FIG. 1 that indicates the changed data in the data repository 102a that needs to be indexed.

The event message 204 may include information that can be used to identify and/or retrieve corresponding data in the data repository 102a. For example, the event message 204 may include one or more data objects IDs (or links) associated with the modified data objects in the data repository 102a, assigned to data objects added to the data repository 102a, or previously associated with data objects removed from the data repository 102a.

The event message 204 may indicate what kind of change to the data repository 102a has been made by the client 202. For example, the event message 204 may indicate that data has been added to the data repository 102a, that data has been modified in the data repository 102a, and/or that data has been removed from the data repository 102a.

In some cases, the event message 204 includes an indication of the type of data object that has been changed, added, or removed. For example, the event message 204 may include an indication that a change occurred with respect to platform analytics, a user library, a project, a data set, etc.

In some cases, the event message 204 includes an indication of the client and/or user that made the change to the data repository 102a. For example, the event message 204 may include an ID for the client 202, a user ID for a user using the client 202 to make the changes to the data repository 102a, etc.

In some cases, the event message 204 includes an indication of the data repository that experienced the change. For example, the event message 204 may include an ID or a link to the data repository 102a.

In some cases, the event message 204 includes an indication of the application server that issued the event message 204. For example, the event message 204 may include an ID for the application server 110a.

In issuing the event message 204, the application server 110a sends the event message 204 to the message broker 120.

In step (C), upon receiving the event message 204, the message broker 120 places the event message 204 in the index event queue 122. In some cases, the message broker 120 reformats the event message 204 before placing it in the queue 122. For example, the message broker 120 may reformat the event message 204 into a format that can be read by the crawler service 124 or is otherwise used by the crawler service 124.

A significant benefit of this approach is that by offloading the processing of the index event messages to the centralized crawler service 124, the processing burden on the application servers 110 can be significantly reduced. Accordingly, the performance of the application servers 110 can be improved. Additionally or alternatively, the processing resources of the application servers 110 can be dedicated to the performance of other and/or additional tasks.

The queue 122 may be loaded with event messages from multiple application servers of the application servers 110. For example, all index event messages generated by the application servers 110 may be sent to the message broker 120 to be placed in the index event queue 122.

In step (D), the crawler service 124 retrieves event messages to process from the index event queue 122. As shown, the crawler service 124 has retrieved the event message 204 from the index event queue 122. After retrieving the event message 204, the crawler service 124 may proceed to analyze the retrieved event message 204 to identify corresponding data in the data repository 102a that needs to be indexed. For example, in analyzing the event message 204, the crawler service 124 may identify one or more data object IDs.

In step (E), the crawler service 124 uses the event message 204 to retrieve corresponding data objects from the data repository 102a. For example, the crawler service 124 may use data object IDs extracted from the event message 204 to retrieve the corresponding data objects from the data repository 102a (or attempt to retrieve corresponding data objects from the data repository 102a).

In some cases where the event message 204 indicates the type of change that happened to the data repository 102a, the crawler service 124 may use the indication in the event message 204 to determine whether or not data needs to be retrieved from the data repository 102a. For example, if the indication provides that a document was deleted from the data repository 102a, the crawler service 124 may not attempt to retrieve the document. Instead, the crawler service 124 may send the corresponding data object ID (e.g., previously associated with the document) along with an indication that the data object has been deleted to the search backend 104.

In retrieving data objects from the data repository 102a, the crawler service 124 may directly communicate with the data repository 102a to retrieve the data objects. Additionally or alternatively, the crawler service 124 may request the corresponding data objects from the appropriate application server of the application servers 110. For example, after identifying the data objects corresponding to the event message 204, the crawler service 124 may generate and send a request for the data objects to the application server 110a.

In step (F), after retrieving the data objects, the crawler service 124 uses the data objects to generate a data package 206. The data package 206 may include the retrieved data objects, e.g., in their original format or after being reformatted by the crawler service 124. Additionally or alternatively, the data package 206 may include information extracted from the data objects.

For example, after retrieving the data objects corresponding to the event message 204, the crawler service 124 may parse through the data objects to extract information. The extracted information may include, for example, metadata of the data objects (e.g., size of the data object, project associations, user associations, data object type, creation dates, modified dates, etc.), an indication of data elements in the data object (e.g., graphs, emails, addresses, etc.), keywords in the data objects, etc. The crawler service 124 may use the extracted information to categorize the data objects and/or parts of the data objects. The crawler service 124 may generate the data package 206 using the data objects, the extracted information, and/or the categorization information.

After generating the data package 206, the crawler service 124 may proceed to transmit the data package 206 to the search backend 104.

As discussed above with respect to FIG. 1, the crawler service 124 may include multiple nodes that each process, for example, a single event message at a time. The number of nodes that the crawler service 124 decides to run may be dynamically determined based on one or more factors. Similarly, determining to spin up or spin down one or more nodes may be dynamically determined based on one or more facts. These factors may include, for example, the number of event messages in the queue 122, the time of day, the date, the number of current users, the number of active users, an anticipated number of event messages, an anticipated number of current or active users, etc.

The index event queue 122 can be a first-in first-out (FIFO) queue. As another example, the index event queue 122 can be a priority queue, in which the priorities of search requests or search events in the queue are prioritized based on factors such as the user identifier, user role, application, or other element associated with the index request or index event. The application server 110*a* may determine and assign a priority when it notifies the message broker 120 of the new index update to be performed.

As an example, if the number of event messages in the queue 122 drops below a certain threshold, the crawler service 124 may spin down (e.g., suspend) one or more running nodes to improve processing efficiency. Similarly, if the number of event messages in the queue 122 reaches a certain threshold, the crawler service 124 may spin up one or more additional nodes to improve processing performance. The threshold may be dynamically determined using, for example, a formula. That formula may include a first variable corresponding to the number of current nodes running and a second variable corresponding to the current, estimated, or anticipated number of event messages in the index event queue 122.

Determining to spin up one or more additional nodes or spin down one or more running nodes may depend on an expected demand. For example, the crawler service 124 may spin up one or more additional nodes if anticipates an increase in event messages based on the date, the time of day, the number of current users, the number of current active users, an anticipated number users, and/or an anticipated number of active users. Similarly, the crawler service 124 may spin down one or more additional nodes if anticipates a decrease in event messages based on the date, the time of day, the number of current users, the number of current active users, an anticipated number users, and/or an anticipated number of active users.

Once a node of the crawler service 124 has finished processing an event message, it may retrieve the next event message in the index event queue 122. Accordingly, in using multiple nodes, event messages can, at times, be processed asynchronously which can lead to improved performance and/or efficiency. For example, processing an event message that requires the crawler service 124 to parse through a large amount of content—and, therefore, will require a relatively large amount of processing time when compared to the processing of a typical event message—will not hold up the processing of other, potentially less time consuming, event messages by other nodes of the crawler service 124.

In step (G), in response to receiving the data package 206, the search backend 104 extracts the contents of the data package 206 and uses the contents to update and/or build the search index 106. Here, using the content in the data package 206, the search backend 104 updates the search index 106 to reflect the changes made to the data in the data repository 102*a*.

Where the data package 206 includes the data objects (e.g., that have been added to the data repository 102*a* or have been updated in the data repository 102*a*), the search backend 104 may parse through the data objects (e.g., instead of the crawling services 124) to extract information that it can use to update and/or build the search index 106. The extracted information may include, for example, metadata of the data objects (e.g., size of the data object, project associations, user associations, data object type, creation dates, modified dates, etc.), an indication of data elements in the data object (e.g., graphs), keywords in the data objects, etc. The search backend 104 may use the extracted information to categorize the data objects and/or parts of the data objects. The search index 106 may be updated to reflect these categories and the corresponding data objects or corresponding parts of the data objects.

In some cases, parsing the data objects to extract information (e.g., extracted by the crawler service 124 and/or the search backend 104) includes parsing analytics data to get object usage data and telemetry data. The search backend 104 can add the object usage data and the telemetry data to the search index 106. This data may be used during searching, as described in more detail below with respect to FIG. 3, to boost search relevance scores for more heavily used data objects.

The search index 106 describes contents of each of the respective data repositories of the application servers 110. For example, the search index 106 describes the contents of the data repository 102*a* for the application server 110*a*, as well as the contents of other data repositories for the other application servers of the application servers 110. That is, the search index 106 serves as a centrally located search index for all of the application servers of the applications servers 110. As such, when a change to any of the corresponding data repositories is made, the search backend 104 only needs to update the search index 106. The search index 106 may be part of the search backend 104.

In an optional step (H), after updating the search index 106, the search backend 104 generates a notification 208 (e.g., confirmation) and sends the notification 208 to the application server 110*a*. The notification 208 may indicate that the search index 106 has successfully been updated, e.g., in response to the event message 204. The search backend 104 may refrain from transmitting the notification 208 to any application server other than the application server 110*a*, e.g., because the update was based on the event message 204. The other application servers of the application servers 110 can assume that the search index 106 is up-to-date unless they are awaiting confirmation for one or more index event messages that they issued. This has the benefit of improving efficiency by not wasting time and resources notifying each of the application servers 110.

As step (H) is optional, the search backend 104 may refrain from generating the notification 208 or any other notification for the application servers 110. That is, with respect to indexing, the system 100 may use a "fire-and-forget" framework such that, other than generating the index event messages and/or passing them to the message broker 120, no further involvement of or management by the application servers 110 is required. This can improve efficiency as time and resources do not need to be dedicated to the notification of the application servers 110 when the index 106 has been updated. Similarly, the application servers 110 do not spend time and/or resources for processing of index update notifications. Instead, the application servers 110 can assume that the search index 106 is up-to-date.

Figure 3:
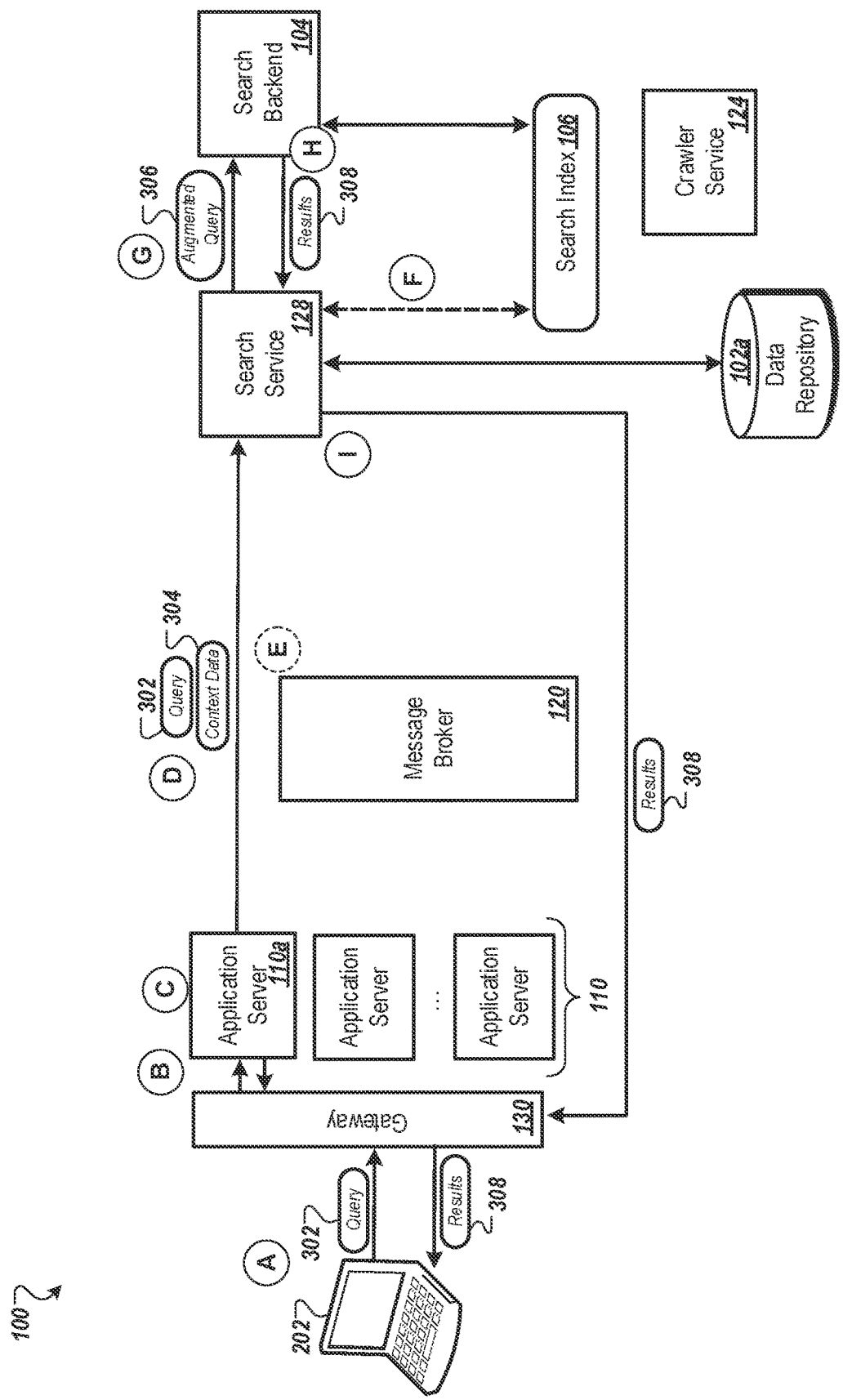
FIG. 3 is a diagram that illustrates an example of actions by the system to receive and process a query.

FIG. 3 shows an example of actions by the system 100 to receive and process a query. Only a subset of the components of the system 100 are shown for clarity in illustration.

In the example of FIG. 3, the client device 202 sends a query 302 to be processed, and the search service 128 augments and enhances the query 302 in order to obtain better results from the search backend 104. For example, the search service 128 can add limitations to the original query 302, add or adjust limitations on which types of data or collections of data are searched, enforce access control restrictions either before or after search results are identified, and perform other enhancements as discussed below. The search service 128 then provides search results for the query to be provided to the client device 202.

In further detail, in step (A), the client device 202 issues a query 302 to the gateway 130. This query can be the result of an explicit query typed or entered by a user, such as a text string entered by the user into a search query field of a user interface. As another example, the query 302 may be a structured query that the user built or developed using a user interface. As another example, the query 302 may be generated by an application without a user specifically requesting a query. For example, upon loading a certain page or view of an application, the application may generate and send the query 302 to obtain data to populate the page or view. Similarly, a user action such as clicking a user interface element to because display or adjustment of a table or chart may similarly cause an application to send a query 302 to request data to present.

In step (B), the gateway 130 provides the query 302 to the appropriate application server 110a from among the set of application servers 110. The query 302 may have an associated server identifier, network address, or other metadata or routing information to specify the appropriate application server 110a, for example, to continue a session of communication that is ongoing between the client 202 and the application server 110a. In other cases, the gateway 130 or a load balancer may select, from among multiple application servers 110, a particular application server to handle the query 302, even if the messages from the client 202 do not specify one.

In step (C), the application server 110 obtains context data 304 related to the query 302. The context data can include data describing factors such as the user, device, time, location, application, task, project, and other factors related to the issuance of the query 302.

The application server can acquire the context data 304 from any of various sources. For example, the application server 110a can use information about a current session of communication with the client device 202 to identify a user identifier for the user, a device identifier for the client device 202, and authentication status of the user, and authorization level or set of privileges or permissions available to the user, an application identifier for an application through which the query 302 was issued, and so on. Information about the user, including an organization, department, role, preferences, history, and so on may be obtained from a user profile for the user or other records. And so on may be obtained from her user profile for the user or other records. Other information including the time that the query 302 was requested can be determined from the messaging from the client device 202 to provide the query 302. If the user is associated with a certain project or data collection, or has files of the query or data collection open at the time the query is issued, the application server 110a can include a project identifier or other data about the software context. In general, the context data can describe the status or state of the client device and the environment in which the query 302 was issued. This may include a description of a task, workflow, or other software context. These are only a few of the different types of context data 304 that the application server 110 may obtain.

In step (D), the application server 110a notifies the search service 128 that a new search should be performed. The application server 110a may generate and send a search request or search event to the search service 128. This search request or search event may include the query 302 and the related context data 304, or additionally or alternatively may include a reference indicating where the query 302 and context data 304 can be obtained. This direct issuance of search requests to the search service 128 can allow for low-latency and high-bandwidth processing of queries, without the need for application servers to devote resources to managing or tracking the search requests. In some implementations, there is a separate search service instance or search service processing node allocated for each application server 110, in order to process the queries forwarded from that application server. In other cases, multiple servers can be assigned to a single search service instance, or potentially there is no specified assignment between servers and search service instances and requests are routed by a management node of the search service 128.

Alternatively, the gateway 130 may notify the search service 128 that a new search should be performed. The gateway 130 may pass the query 302 along to the search service 128. Similar to the application server 110a, the gateway 130 may generate and send a search request or search event to the search service 128. This search request or search event may include the query 302 and the related context data 304, or additionally or alternatively may include a reference indicating where the query 302 and context data 304 can be obtained. For example, in response to receiving the query 302 from the gateway 130, the search service 128 may access corresponding context data directly from the data repository 102a or may request corresponding context data from the application server 110a.

Alternatively, it is possible for searches to be processed in a queue, similar to the index event queue 122. In this version, the application server 110a may notify the message broker 120 that a new search should be performed, and the message broker 120 enters the new search into a search event queue. The application server 110a may generate and send a search request or search event to the message broker 120. This search request or search event may include the query 302 and the related context data 304, or additionally or alternatively may include a reference indicating where the query 302 and context data 304 can be obtained.

The search event queue, if one is used, can be a first-in first-out (FIFO) queue. As another example, the search event queue can be a priority queue, in which the priorities of search requests or search events in the queue are prioritized based on factors such as the user identifier, user role, application, or other element associated with the search request or search event. The application server 110a may determine and assign a priority when it notifies the message broker 120 of the new search to be performed.

In optional step (E), if a search event queue is used, the search service 128 extracts the search request or search event from the search event queue. For example, different search service instances or processing nodes can operate in parallel to concurrently extract and process search requests from the search event queue. One of the search service instances request the next search request from the search event queue, and receives the record for the query 302 and its accompanying context data 304.

In step (F), the search service 128 accesses additional information to use in processing the query 302 prior to execution of a search based on the query 302. This can include several different aspects including acquiring data indirectly from a search index 106, from the data repository 102*a*, from a semantic graph, or from other data sources.

For example, the search service 128 can receive an identifier for the user associated with the query 302. Based on this user identifier, the search service 128 can request and receive data indicating the privileges of the user, a current authentication level of the user (e.g., whether the user is currently logged in or authenticated), a status of the users credentials a status of the users credentials (e.g., valid, expired, revoked, etc.), and so on. This information will be useful to the search service 128 as it tailors the query 302 further to limit the search to the data types and collections that the user is authorized to access. For example, if the user does not have the appropriate credential to access a data collection, the search service 128 may later append a limitation that excludes that data collection. As another example, if the user does not have the authentication status needed to execute files, then the search service 128 may add a constraint to exclude executable files from the search results.

The search service 128 may indirectly acquire data from the search index 106 through the search backend 104. For example, the search service 128 may request certain information in the search index 106 from the search backend 104 after receiving the query 302. The search service 128 may use this information in generating the augmented query 306. Additionally or alternatively, the search service 128 may have previously requested, received, and cached data from the search index 106. The search service 128 may use this previously cached data in generating the augmented query 306.

The search service 128 can also use the user identifier to obtain information about current or previous data access and data used by the user, which can indicate parameters to focus or to weight search results for the current user. Research service may access usage data, such as access logs, from a platform telemetry service.

In some implementations, the search service 128 accesses data from a semantic graph. The semantic graph can include records for different data objects representing software elements, people, places, things, concepts, and so on. The semantic graph can include data indicating strengths of relationships between the objects, which can be expressed as edge weights or other parameters within the semantic graph. The search service 128 can use the identifiers in the context data 304 to identify related objects, topics, keywords, historical usage, and so on to provide a more contextualized or more detailed or expensive interpretation of the query 302. For example, the connections in the semantic graph in the semantic graph between a user object for the user and objects representing items mentioned in the query 302 can be obtained and used to later generate an enhanced query that incorporates more information about the user preferences, history, and likely intention when issuing the query 302.

In step (G), the search service generates an augmented query 306 and provides it to the search backend 104. The augmented query 306 can be generated based on the query 302 and using the context data 304 and other information that the search service 128 obtained in step (F). For example, the search service can use the context data and additional retrieved data to generate a new, more detailed query that may include additional query constraints. For example, the augmented query 306 may limit the search results further by limiting results for a particular project, data collection, range of time, location, etc. As another example, the search service 128 may add a constraint or limitation to enforce access control measures, e.g., to exclude one or more data types, data collections, file types, etc. From query processing and query results. As another example, the search service 128 may expand the scope of the query 302 by adding keywords determined from context data, search index data, or other data as synonyms (e.g., alternative keywords not in the original query 302 that may signal a relevant result just as the keywords of the original query 302). The augmented query 306 can include additional limitations added by the search service 128, remove one or more limitations of the original query 302 or replace original limitations of the query 302, may change parameters of structured query operations of the query 302 and so on.

In some cases, the search backend 104 receives queries through an application programming interface (API) that may not be customizable. The search backend 104, even if run locally or by the same enterprise as the application server, may use third-party developed software that requires queries to be in certain formats. The augmented query 306 can include the various limitations that the search service decides to include, formatted or formulated in the manner required for processing by the search backend 104.

In step (H), the search backend 104 executes a search based on the augmented query 306 and returns the search results 308 to the search service 128. The search results can include, for example, a list of identifiers for data elements (e.g., files, documents, data sets, data sources, data collections, portions of databases (such as tables, columns, rows, fields, or values), attributes, metrics, etc.), objects registered in the semantic graph or other meta-data repository for the enterprise system (e.g., objects such as locations, users, applications, products, competitors, vendors, clients, etc.), or other types of results.

In step (I), the search service 128 performs post processing on the results 308. This can include filtering the results 308 do you remove items that the search service determines are not appropriate given access control restrictions for the current user and context.

The search service 128 provides the results 308 (potentially as processed in the post processing) for output in response to the original query 302. In some implementations, the search service provides the results to the application server 110*a* through which the query 302 was provided. This can enable the application server 110*a* to incorporate the results 308 into its processing, such as to integrate into a user interface or perform application specific processing. In other implementations, as shown in FIG. 3, the results 308 may be provided to the gateway 130 which may optionally provide the results 308 directly to the client device 202 without first forwarding the results 308 to the application server 110*a*. In some cases, the gateway 130 may include or be associated with a web server or other frontend server which can merge or otherwise combine search results 308 with other data from the application server 110*a* to generate output to the client device 202.

Figure 4:
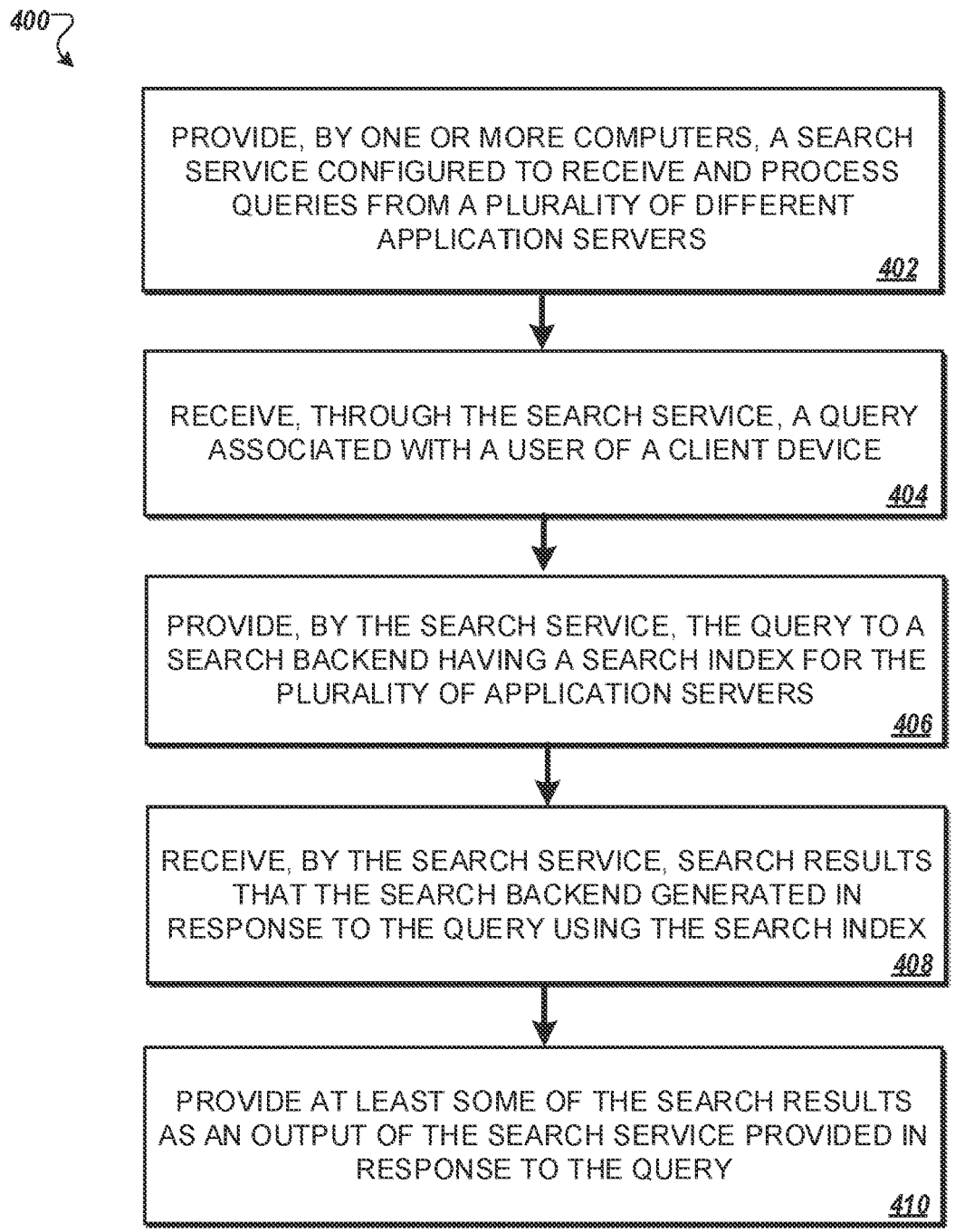
FIG. 4 is a flow diagram of an example process for enhanced data indexing and searching.

FIG. 4 shows a flow diagram that illustrates an example process 400 for processing search queries and providing results. The process 400 can be performed by one or more computers, such as one or more servers, workstations, cloud-computing systems, etc.

As discussed above, the arrangement of the search service with respect to the backend provides index management across different application servers, different processor clusters, and across different user projects. A common, shared index is used for multiple application servers, rather than different application server nodes having their own separate search indexes, and so there is no need to synchronize index contexts across. Application servers are relieved of managing and processing indexing and search operations. Application servers can send events to central indexing and search queues and let other processing resources handle the searching and indexing.

The arrangement also enhances scalability of the system. Many application servers send index events and search events which are combined into a shared index event queue and a shared search event queue. From the central queues, different crawler service instances and search service instances can extract items from the queues and process them independently and in parallel. When index event volume is high, additional crawler service instances can be initialized and run concurrently. When index event volume is low, some crawler service instances can be stopped to free up additional resources. Similarly, when search request volume is high, additional search service instances can be initialized and run concurrently. When search event volume is low, the number of search service instances can be decreased.

The search index itself is enhanced with information beyond an indication of the contents of the documents or data in the repository. For example, the search index associates data items with corresponding access control information and permissions, usage data, attributes or metadata, and more. The search index can also index documents and data with a project identifier field to indicate a related project, or with custom-defined fields. These items allow the search service to act as a query pre-processor, adding context, permissions, adjusting the scope of query statements and the collections and data to be searched.

The process 400 includes providing, by the one or more computers, a search service configured to receive and process queries from a plurality of different application servers (402). Each application server comprises one or more processing nodes and has an associated data repository for the application server. The search index can be a search index for a combined set of data that includes the content of the data repositories for each of the plurality of application servers. The application servers can be any combination of local or on-premises servers, remote servers, cloud-computing-based servers, etc. Each of the data repositories may comprise at least some unique content not present in the data repositories of other application servers. In other implementations, the data repositories may be different copies or portions of a distributed file system. In some cases, the different repositories may be periodically synchronized to include the same contents, but before synchronization is complete the different copies of the file system may be different, at least temporarily, after changes are committed to individual copies.

The search service can be implemented using multiple processing nodes to provide multiple search service instances. These different search service instances can operate in parallel to concurrently process search requests issued by client devices to the different application servers. In some implementations, the system dynamically adjusts the number of processing nodes or a number of search service instances that are active (e.g., scaling up or down) based on a volume of query requests received by the application servers. The system can detect that search demand satisfies a threshold, and in response, increase a number of instances of the search service that are active or increasing an amount of processing resources allocated for the search service. For example, the number of search service instances that are running can vary (e.g., be increased or decreased) based on the number of search requests yet to be processed that remain in a search request queue of the system.

The process 400 includes receiving, through the search service, a query associated with a user of a client device (404). For example, the search service can receive a query that was forwarded by a particular application server in response to the particular application server receiving the query from a client device.

In some implementations, the system maintains a search request queue to store search requests issued by the different application servers based on queries received by the application servers from client devices. The various instances or processing nodes of the search service can request or extract search request events from the search request queue and process the search requests. This process can be done asynchronously, e.g., in a non-blocking manner, with respect to processing of the application servers and using separate processing resources from the application servers. As a result, the search service can offload the computational demands of managing and carrying out searches, leaving greater capacity for the application servers to handle other tasks.

The search service can receive and use context information corresponding to the query. Application servers may provide this context information that describes, for example: the source of the query (e.g., the geographical location, network location, user, device, organization, department, etc. from which the query was requested); a software context for the query (e.g., an application, user interface, web page, or other software elements through which the query was received); a workflow or task being performed by the user or client device that initiated the query; telemetry data indicating activity, status, or state of a device that provided the query; and so on. Examples of context data include: a user identifier for the user; data indicating a job role of the user; data indicating an organization or department of the user; a device identifier for the client device; a server identifier for a particular application server that received the query from the client device; an application identifier for an application from which the query was initiated; data indicating a device type for the client device; a location of the client device; a time the query was issued; a user interface from which the query was initiated; telemetry data from the client device indicating a state or status of the client device; and data indicating a task, workflow, or project associated with the user.

The search service uses the context information to generate an augmented query based on the query and the context information. The search service then provides the augmented query to the search backend, which allows the search backend to identify more relevant results and better rank the results that are identified. There are many different types of operations that the search service may perform to generate the augmented query. In general, the search service may act as a query pre-processor, modifying, formatting, and reformulating the query for processing by the search backend (e.g., a search engine). Typically, the search service can generate the augmented query by altering a scope of the query based on the context data or adding additional data for ranking results. For example, the search service can add a limitation to the query based on the context information, where the added limitation restricts a scope of search results obtained. For example, the added limitation may narrow the scope to a project that the user is associated with if the context information indicates that the query is provided through a project management interface. As another example, the search service can add attributes to the query, which can be used to adjust a ranking of search results based on the augmented query. The search service can restrict a scope of the query based on access permissions for the user, potentially adding structured query language (SQL) parameters or elements to narrow the scope of results received. For example, if the user's credentials or permissions are not sufficient for executing files or if the context information indicates that the user is not authenticated, elements can be added to the query to exclude executable content. The search service can limit a set of data sources or data collections to be searched. This may be used to exclude data sources or data collections that the user does not have privileges or authentication to access. It may also be used to focus the search to one or more data sources or data collections that are determined to be of highest relevance to the query based on the context information. The search service can alter the query to indicate a level of access for the user based on a current level of authentication of the user.

In addition to or instead of using context information to augment or modify a query, the search service can use information from the search index, a semantic graph defining metadata and relationships among data objects, or other data. For example, the search service can populate or add fields with values that the search service retrieves from the search index or a semantic graph that indicates relationships among objects defined in a centralized metadata repository. The search service can add information based on one or more prior data accesses by the user. The search service can add keywords determined from the search index or the semantic graph.

Before providing the query to the search backend, the search service can perform pre-processing of the query using data access policies, user authentication data, user identity data for the user, or data access permissions of the user. The pre-processing can generate a reformulated query that aligns with requirements of an application programming interface (API) of the search backend. In some cases, the search backend is run by a third party, or includes software designed by a third party, and so may not be customizable. The search service can formulate and adapt the query for the needs of the search backend, translating parameters or statements into a format that the search backend accepts. This relieves the application servers of the need to adjust their query issuing formats and allows the search backend to be changed or replaced with a different version in a way that is transparent to the application servers.

The process 400 includes providing, by the search service, the query to a search backend having a search index for the plurality of application servers (406). The search index describes contents of each of the respective data repositories of the application servers.

The process 400 includes receiving, by the search service, search results that the search backend generated in response to the query using the search index (408). The search results can include search results representing data elements (e.g., data items, data sources, documents, files, records, values, etc.) from different data repositories of the different application servers.

The process 400 includes providing at least some of the search results as an output of the search service provided in response to the query (410). For example, the search service can provide the search results to the particular application server that forwarded the query from a user, e.g., the server that issued a search request event that the search service acted on to initiate the search.

In some implementations, the search service determines whether the user is authorized to access the data represented by the search results. The search service then filters the results to remove results that correspond to data that the user is not authorized to access. The search service provides the filtered results to the application server, which are then forwarded on to the client that issued the query. In some cases, the search service may provide search results directly to the client, bypassing the application server.

The system can also be used to perform indexing of data to update and maintain the search index. For example, the system can maintain an index event queue to store indexing requests issued by the different application servers in response to changes in data in their respective repositories. Multiple data retrieval module instances (e.g., crawler service instances) are configured to operate in parallel. Each data retrieval module instance is configured to: obtain index events from the index event queue; communicate with the application server that issued the index event to obtain the data item corresponding to the index even from the data repository of the application server that issued the index event; and provide the retrieved data to the search engine backend for processing, the search backend being configured to update the index to include information describing the data item.

In some implementations, the system accesses usage data indicating measures of use of different data objects in the repositories of the different application servers. The measures of use can include items such as: a measure of execution time or loading time for the data item; a measure of a number of users that have used the data item; a total accesses made to the data item; and a rate of errors occurring for uses of the data item. The indexing service incorporates the measures of use of the different data objects into the search index. Later, when processing queries, the search service can use the usage data in the index to modify queries, or the search backend can use the measures of use of the different data objects to boost search relevance scores for more heavily used objects. The search relevance scores can be used to select and/or rank the search results for the query.

The indexing of the data repositories of the different application servers can create a search index that provides a single, unified search index across all of the respective data repositories for the different application servers. Many different types of data can be used to enhance the indexing. For example, indexing can include, in the search index, data associated with respective data items that includes at least one of: measures of usage of the data items; access control data that indicates access policies or access restrictions for the data items; identifiers indicating one or more of organizations, departments, users, or projects associated with the data items; subscription data indicating organizations, departments, users, or user roles that are subscribed to receive the data items; and collaboration data indicating sharing of data items or shared use of data items among users.

In some implementations, the search service or other functionality of the system can generate a data package comprising index data from the search index. The search service provides the data package to a client device to enable the client device to perform local, client-side search (e.g., potentially offline or without network access) of at least some of the contents of the data repositories of the application servers using the index data. Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, comprising:
   providing, by the one or more computers, a search service configured to receive and process queries from each of a plurality of different application servers, wherein each application server comprises one or more processing nodes and has an associated data repository that stores files associated with the application server, wherein at least some contents of the data repositories is different for different application servers, wherein the search service is provided by one or more search service processing nodes that are separate from the processing nodes of the application servers, each of the application servers being configured to send messages in response to changes in the contents of the application server's associated data repository, the messages each comprising an indication of one of the data repositories and an identifier for a data object that changed, and wherein the search service is configured to manage incoming queries from the different application servers before processing by a search backend that is configured to respond to queries based on a shared search index that combines information describing contents of each of the data repositories of the application servers;
   providing, by the one or more computers, a second service configured to manage data retrieval for the search backend to perform updates to the shared search index that combines information describing the contents of the data repositories of the plurality of application servers, wherein the second service is provided by one or more processing nodes that are separate from the search service processing nodes and the processing nodes of the application servers, wherein the second service is configured to (i) receive messages sent by the respective application servers in response to changes in the contents of the respective data repositories of the application servers, (ii) generate, for each of the received messages, a data package comprising information enabling the search backend to update the shared search index based on the change corresponding to the received message, wherein, for at least some of the received messages, generating the data package comprises (a) retrieving the data object corresponding to the identifier in the received message from the data repository indicated by the received message and (b) including at least a portion of the retrieved data object in the data package, and (iii) send the data packages to the search backend to cause the search backend to update the shared search index;
   receiving, by the one or more computers and through the search service, a query associated with a user of a client device;
   providing, by the one or more computers and by the search service, the query to the search backend having the shared search index for the plurality of application servers, wherein the shared search index has been updated based on the data packages generated by the second service and where the shared search index includes indications of keywords determined to be present in the respective files of the respective data repositories of the application servers based on an analysis of contents of the files of each of the respective data repositories;
   receiving, by the one or more computers, search results that the search backend generated in response to the query using the shared search index to search across a combined set of content of the data repositories of the plurality of application servers, the search results including search results representing data elements from different data repositories of the different application servers; and
   providing, by the one or more computers, at least some of the search results as an output of the search service provided in response to the query.

2. The method of claim 1, wherein receiving the query comprises receiving a query forwarded by a particular application server of the application servers in response to the particular application server receiving the query sent by the client device; and
   wherein providing the search results comprise providing the at least some of the search results to the particular application server.

3. The method of claim 1, wherein the search service is implemented using multiple search service processing nodes to provide multiple search service instances that operate in parallel to concurrently process search requests issued by client devices to the different application servers;
   wherein the method comprises dynamically scaling a number of processing nodes or a number of search service instances that are active based on a volume of query requests received by the application servers.

4. The method of claim 3, comprising maintaining, by the one or more computers, a search request queue to store search requests issued by the different application servers based on queries received by the application servers from client devices;
   wherein receiving the query comprises obtaining, by one of the search service instances, the query from the search request queue.

5. The method of claim 3, comprising:
detecting that search demand satisfies a threshold; and
in response, increasing a number of instances of the search service that are active or increasing an amount of processing resources allocated for the search service.

6. The method of claim 1, comprising:
receiving context information corresponding to the query;
based on the context information, retrieving one or more values from the shared search index or a semantic graph that indicates relationships among objects defined in a centralized metadata repository; and
generating an augmented query based on the query and the context information, wherein the augmented query includes the one or more values retrieved from the shared search index or the semantic graph;
wherein providing the query to the search backend comprises providing the augmented query to the search backend.

7. The method of claim 1, comprising:
in response to receiving the query, accessing the shared search index; and
using data from the shared search index to augment the query;
wherein providing the query to the search backend comprises providing the augmented query to the search backend.

8. The method of claim 1, comprising:
before providing the query to the search backend, performing pre-processing of the query by the search service using data access policies, user authentication data, user identity data for the user, or data access permissions of the user, the pre-processing generating a reformulated query for an application programming interface (API) of the search backend;
wherein providing the query to the search backend comprises providing the reformulated query to the search backend through the API.

9. The method of claim 1, comprising:
determining, by the search service and for each of the search results, whether the user is authorized to access the data represented by the search result; and
filtering the results to remove one or more results that corresponds to data that the user is not authorized to access;
wherein providing at least some of the search results comprises providing the filtered results.

10. The method of claim 1, comprising maintaining, by the one or more computers, an index event queue to store indexing requests issued by the different application servers in response to changes in data in their respective repositories;
operating multiple data retrieval module instances configured to operate in parallel, wherein each of the data retrieval module instances are configured to:
obtain index events from the index event queue;
communicate with the application server that issued the index event to obtain a data item corresponding to the index event from the data repository of the application server that issued the index event; and
provide the retrieved data item to the search backend for processing, the search backend being configured to update the index to include information describing the data item.

11. The method of claim 1, comprising:
generating a data package comprising index data from the shared search index; and
providing the data package to a client device to enable the client device to perform local, client-side search of at least some of the contents of the data repositories of the application servers using the index data.

12. The method of claim 1, comprising:
accessing usage data indicating measures of use of different data objects in the repositories of the different application servers;
incorporating the measures of use of the different data objects into the shared search index; and
using the measures of use of the different data objects to boost search relevance scores for more heavily used objects, the search relevance scores being used to select and/or rank the search results for the query.

13. The method of claim 12, wherein the measures of use comprise one or more of a measure of execution time or loading time for a data object, a measure of a number of users that have used the data object, a total accesses made to the data object, or a rate of errors occurring for uses of the data object.

14. The method of claim 1, comprising indexing contents of the data repositories of the different application servers such that the shared search index provides a single, unified search index across all of the respective data repositories for the different application servers,
wherein indexing the contents of the data repositories comprises including, in the shared search index, data associated with respective data items that includes at least one of:
measures of usage of the data items;
access control data that indicates access policies or access restrictions for the data items;
identifiers indicating one or more of organizations, departments, users, or projects associated with the data items;
subscription data indicating organizations, departments, users, or user roles that are subscribed to receive the data items; or
collaboration data indicating sharing of data items or shared use of data items among users.

15. The method of claim 1, comprising:
receiving an indication that content of a file stored in the data repository of one of the application servers has changed;
in response to receiving the indication that the content of the file has changed, analyzing the content of the file to determine keywords or types of data element present in the file; and
updating the search index to indicate the determined keywords or types of data elements present in the file stored on the data repository.

16. The method of claim 1, wherein receiving the query comprises receiving the query from one of the application servers in response to a particular application server receiving the query sent by the client device; and
wherein providing the search results comprises bypassing the application server that sent the query to the search service to provide the at least some of the search results to the client device without providing the at least some of the search results to the application server that sent the query to the search service.

17. The method of claim 1, wherein the messages sent by the application servers each indicates which of multiple types of changes occurred for the data object identified by the identifier in the message; and
wherein the second service is configured to use, for each of the messages, the indication of which of the multiple types of changes occurred to selectively retrieve the data object identified by the identifier in the message, such that for a first type of change the second service retrieves the data object identified by the message and for a second type of change the second service does not retrieve the data object identified by the message.

18. A system comprising:
one or more computers; and
one or more computer-readable media storing instructions that are operable, when executed by the one or more computers, to cause the one or more computers to perform operations comprising:
  providing, by the one or more computers, a search service configured to receive and process queries from each of a plurality of different application servers, wherein each application server comprises one or more processing nodes and has an associated data repository that stores files associated with the application server, wherein at least some contents of the data repositories is different for different application servers, wherein the search service is provided by one or more search service processing nodes that are separate from the processing nodes of the application servers, each of the application servers being configured to send messages in response to changes in the contents of the application server's associated data repository, the messages each comprising an indication of one of the data repositories and an identifier for a data object that changed, and wherein the search service is configured to manage incoming queries from the different application servers before processing by a search backend that is configured to respond to queries based on a shared search index that combines information describing contents of each of the data repositories of the application servers;
  providing, by the one or more computers, a second service configured to manage data retrieval for the search backend to perform updates to the shared search index that combines information describing the contents of the data repositories of the plurality of application servers, wherein the second service is provided by one or more processing nodes that are separate from the search service processing nodes and the processing nodes of the application servers, wherein the second service is configured to (i) receive messages sent by the respective application servers in response to changes in the contents of the respective data repositories of the application servers, (ii) generate, for each of the received messages, a data package comprising information enabling the search backend to update the shared search index based on the change corresponding to the received message, wherein, for at least some of the received messages, generating the data package comprises (a) retrieving the data object corresponding to the identifier in the received message from the data repository indicated by the received message and (b) including at least a portion of the retrieved data object in the data package, and (iii) send the data packages to the search backend to cause the search backend to update the shared search index;
  receiving, by the one or more computers and through the search service, a query associated with a user of a client device;
  providing, by the one or more computers and by the search service, the query to the search backend having the shared search index for the plurality of application servers, wherein the shared search index has been updated based on the data packages generated by the second service and where the shared search index includes indications of keywords determined to be present in the respective files of the respective data repositories of the application servers based on an analysis of contents of the files of each of the respective data repositories;
  receiving, by the one or more computers, search results that the search backend generated in response to the query using the shared search index to search across a combined set of content of the data repositories of the plurality of application servers, the search results including search results representing data elements from different data repositories of the different application servers; and
  providing, by the one or more computers, at least some of the search results as an output of the search service provided in response to the query.

19. One or more non-transitory computer-readable media storing instructions that are operable, when executed by one or more computers, to cause the one or more computers to perform operations comprising:
  providing, by the one or more computers, a search service configured to receive and process queries from each of a plurality of different application servers, wherein each application server comprises one or more processing nodes and has an associated data repository that stores files associated with the application server, wherein at least some contents of the data repositories is different for different application servers, wherein the search service is provided by one or more search service processing nodes that are separate from the processing nodes of the application servers, each of the application servers being configured to send, in response to a change to a data object in the application server's associated data repository, an index event message that identifies the changed data object, the index event messages each comprising an indication of one of the data repositories and an identifier for a data object that changed, and wherein the search service is configured to manage incoming queries from the different application servers before processing by a search backend that is configured to respond to queries based on a shared search index that combines information describing contents of each of the data repositories of the application servers;
  maintaining, by the one or more computers, an index event queue configured to store index event messages from the different application servers;
  providing, by the one or more computers, a second service configured to manage data retrieval for the search backend to perform updates to the shared search index for the plurality of application servers that combines information describing the contents of the data repositories of the plurality of application servers, wherein the second service is provided by one or more processing nodes that are separate from the search service processing nodes and the processing nodes of the application servers, wherein the second service is configured to extract, from the index event queue, index event messages sent by the respective application servers in response to changes in the contents of the respective data repositories of the application servers, and wherein the second service is configured to, based on a particular index event message extracted from the index event queue, (i) retrieve, from the data repository of the application server that sent the particular index event message, the data object identified by the particular index event message, (ii) generate a data package based on the retrieved data object, wherein the data package includes the retrieved data object or data extracted from the retrieved data object, and (iii) send the data package to the search backend to cause the search backend to update the shared search index based on the data included in the generated data package;

receiving, by the one or more computers and through the search service, a query associated with a user of a client device;

providing, by the one or more computers and by the search service, the query to the search backend having the shared search index for the plurality of application servers, wherein the shared search index has been updated based on the data packages generated by the second service and where the shared search index includes indications of keywords determined to be present in the respective files of the respective data repositories of the application servers based on an analysis of contents of the files of each of the respective data repositories;

receiving, by the one or more computers, search results that the search backend generated in response to the query using the shared search index to search across a combined set of content of the data repositories of the plurality of application servers, the search results including search results representing data elements from different data repositories of the different application servers; and providing, by the one or more computers, at least some of the search results as an output of the search service provided in response to the query.

20. The one or more non-transitory computer-readable media of claim 19, wherein the second service comprises multiple processing nodes that are configured to operate in parallel to retrieve data based on the index event messages, wherein the number of processing nodes that operate in parallel is varied according to an amount of index event messages in the index event queue.

* * * * *